(12) United States Patent
Zeng (10) Patent No.: US 10,810,019 B2
(45) Date of Patent: *Oct. 20, 2020

(54) METHOD FOR INTERFACE REFRESH SYNCHRONIZATION, TERMINAL DEVICE, AND NON-TRANSITORY COMPUTER-READABLE STORAGE MEDIUM

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 77 days.

This patent is subject to a terminal disclaimer.

(21) Appl. No.: 16/122,409

(22) Filed: Sep. 5, 2018

(65) Prior Publication Data
US 2018/0365032 A1    Dec. 20, 2018

Related U.S. Application Data

(63) Continuation-in-part of application No. PCT/CN2017/086529, filed on May 31, 2017.

(30) Foreign Application Priority Data

May 31, 2016    (CN) .......................... 2016 1 0382641

(51) Int. Cl.
*G06F 9/445*    (2018.01)
*G06F 9/451*    (2018.01)
(Continued)

(52) U.S. Cl.
CPC ............ *G06F 9/44505* (2013.01); *G06F 1/14* (2013.01); *G06F 3/14* (2013.01); *G06F 9/44* (2013.01);
(Continued)

(58) Field of Classification Search
CPC ..... G06F 1/14; G06F 3/14; G06F 9/44; G06F 9/44505; G06F 9/451; G06F 9/452; G06F 9/50
See application file for complete search history.

(56) References Cited

U.S. PATENT DOCUMENTS 8,903,458 B1    12/2014 Ho
9,619,241 B2    4/2017 Chung et al.
(Continued)

FOREIGN PATENT DOCUMENTS

CN    102109959 A    6/2011
CN    102622557 A    8/2012
(Continued)

OTHER PUBLICATIONS

Examination report issued in corresponding IN application No. 201837032814 dated Jul. 30, 2020.

*Primary Examiner* — Terrell S Johnson (57) ABSTRACT

A method for interface refresh synchronization, a terminal device, and a non-transitory computer-readable storage medium are provided. The method includes: obtaining, in a user space of an operating system, refresh information of a plurality of interface refresh operations, when the plurality of interface refresh operations are initiated by a plurality of foreground applications in the user space; and transmitting the obtained refresh information of the plurality of interface refresh operations to a kernel space of the operating system, the refresh information including a thread number of each
(Continued)

interface refresh operation, refresh time and refresh contents corresponding to each thread number.

20 Claims, 4 Drawing Sheets

(51) Int. Cl.
    *G06F 3/14*         (2006.01)
    *G06F 9/44*         (2018.01)
    *G06F 9/50*         (2006.01)
    *G06F 1/14*         (2006.01)

(52) U.S. Cl.
    CPC .............. *G06F 9/451* (2018.02); *G06F 9/452* (2018.02); *G06F 9/50* (2013.01)

(56) References Cited

U.S. PATENT DOCUMENTS

| | | | |
|---|---|---|---|
| 2003/0221094 A1* | 11/2003 | Pennarun | G06F 9/4416 713/1 |
| 2013/0278614 A1* | 10/2013 | Sultenfuss | G09G 3/3406 345/520 |
| 2014/0256295 A1 | 9/2014 | Peng et al. | |
| 2017/0090879 A1 | 3/2017 | Veltri et al. | |
| 2018/0113646 A1 | 4/2018 | Spivak et al. | |

FOREIGN PATENT DOCUMENTS

| | | |
|---|---|---|
| CN | 104282286 A | 1/2015 |
| CN | 104407965 A | 3/2015 |

* cited by examiner

METHOD FOR INTERFACE REFRESH SYNCHRONIZATION, TERMINAL DEVICE, AND NON-TRANSITORY COMPUTER-READABLE STORAGE MEDIUM

CROSS-REFERENCE TO RELATED APPLICATION(S)

This application is a continuation in part application of International Application No. PCT/CN2017/086529, filed on May 31, 2017, which claims priority to Chinese Patent Application No. 201610382641.7, filed on May 31, 2016, the entire disclosure of both of which are hereby incorporated by reference in their entireties.

TECHNICAL FIELD

The present disclosure relates to the technical field of computers, and more particularly to a method for interface refresh synchronization, a terminal device, and a non-transitory computer-readable storage medium.

BACKGROUND

The current mainstream operating system is usually divided into two kinds of operating space: kernel space and user space. The kernel space is mainly for various core functions (such as clock, task scheduling, FM regulator, interrupt response, etc.) of an operating system. Various applications are mainly run in the user space. In a system having a human-machine interaction interface, the interface refresh rate and the interface refresh contents of the foreground applications of the human-machine interaction and the interface refresh will directly affect user experience.

SUMMARY

Implementations of the present disclosure provide a method for interface refresh synchronization, a terminal device, and a non-transitory computer-readable storage medium, to enable a kernel to learn about each specific interface refresh operation of each foreground application.

According to a first aspect, a method for interface refresh synchronization is provided. The method includes: obtaining, in a user space of an operating system, refresh information of a plurality of interface refresh operations, when the plurality of interface refresh operations are initiated by a plurality of foreground applications in the user space, the refresh information including a thread number of each interface refresh operation, refresh time and refresh contents corresponding to each thread number; and transmitting the obtained refresh information of the plurality of interface refresh operations to a kernel space of the operating system.

According to a second aspect, a terminal device is provided. The terminal device includes at least one processor and a computer readable storage, coupled to the at least one processor. The computer readable storage stores at least one computer executable instruction thereon, which when executed by the at least one processor, cause the at least one processor to carry out actions, including: obtaining, in a user space of an operating system, refresh information of a plurality of interface refresh operations, when the plurality of interface refresh operations are initiated by a plurality of foreground applications in the user space, the refresh information including a thread number of each interface refresh operation, refresh time and refresh contents corresponding to each thread number; and transmitting the obtained refresh information of the plurality of interface refresh operations to a kernel space of the operating system.

According to a third aspect, a non-transitory computer readable storage medium is provided. The storage medium is configured to store computer programs which, when executed by a processor, causes the processor to carry out following actions: obtaining, in a user space of an operating system, refresh information of a plurality of interface refresh operations, when the plurality of interface refresh operations are initiated by a plurality of foreground applications in the user space, wherein the refresh information includes a thread number of each interface refresh operation, refresh time and refresh contents corresponding to each thread number; and transmitting the obtained refresh information of the plurality of interface refresh operations to a kernel space of the operating system.

BRIEF DESCRIPTION OF THE DRAWINGS

To describe technical solutions in the implementations of the present disclosure or of the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

In many scenarios of human-machine interaction, for example, in an Internet interface of a mobile phone, the signal bar application is responsible for updating the signal display, and the browser is responsible for updating the content of the web-page, while the power control module is responsible for updating the icon for indicating battery level. After a plurality of foreground applications complete the preparation of their one frame display data of their display windows, the display data prepared is synthesized with the content of the current entire display layer to obtain display content synthesized, then a display interface of the kernel is actively called, and the display content synthesized will be sent to a display device for display. In this process, what the kernel receives is the display content of a complete layer, and the kernel is able to count the overall screen refresh rate. However, the kernel does not receive the refresh information of each individual application, and does not know which specific thread of each application is responsible for refreshing, as well as each specific refresh behavior and its refresh content, which causes the kernel be unable to accurately perceive the resource requirements for the interface update services of the foreground application, when the kernel makes core number control and frequency modulation strategy of the central processing unit (CPU)/graphics processor unit (GPU), and causes performance issues such as applications stuck, applications crashed, and so on, and further lead to power consumption issues related to these performance issues.

By implementing a method and an apparatus for interface refresh synchronization, a terminal device and a storage medium provided by implementations of the present disclosure, refresh information of a plurality of interface refresh operations is obtained in a user space of an operating system, when the plurality of interface refresh operations are initiated by a plurality of foreground applications in the user space, and the obtained refresh information of the plurality of interface refresh operations is transmitted to a kernel space of the operating system, the refresh information including a thread number of each interface refresh operation, refresh time and refresh contents corresponding to each thread number, thereby the kernel can learn about each specific interface refresh operation of each foreground application.

The foreground applications are relative to background applications. The foreground applications and the background applications refer to the applications that are running in the system. The applications which are currently displayed to user and can be operated by the user are the foreground applications, and the applications which are running in the background of the system are the background applications. The foreground applications generally run in the user space of the operating system.

Implementations of the disclosure will be detailed below.

According to implementations of the present disclosure, a method for interface refresh synchronization is provided. The method includes: obtaining, in a user space of an operating system, refresh information of a plurality of interface refresh operations, when the plurality of interface refresh operations are initiated by a plurality of foreground applications in the user space, the refresh information including a thread number of each interface refresh operation, refresh time and refresh contents corresponding to each thread number; and transmitting the obtained refresh information of the plurality of interface refresh operations to a kernel space of the operating system.

According to implementations of the present disclosure, an apparatus for interface refresh synchronization is provided. The apparatus includes: an obtaining module configured to obtain, in a user space of an operating system, refresh information of a plurality of interface refresh operations, when the plurality of interface refresh operations are initiated by a plurality of foreground applications in the user space, the refresh information including a thread number of each interface refresh operation, refresh time and refresh contents corresponding to each thread number; and a transmitting module, configured to transmit the obtained refresh information of the plurality of interface refresh operations to a kernel space of the operating system.

According to implementations of the present disclosure, a terminal device is provided. The terminal device includes at least one processor and a computer readable storage, coupled to the at least one processor. The computer readable storage stores at least one computer executable instruction thereon, which when executed by the at least one processor, cause the at least one processor to carry out actions, including: obtaining, in a user space of an operating system, refresh information of a plurality of interface refresh operations, when the plurality of interface refresh operations are initiated by a plurality of foreground applications in the user space, the refresh information including a thread number of each interface refresh operation, refresh time and refresh contents corresponding to each thread number; and transmitting the obtained refresh information of the plurality of interface refresh operations to a kernel space of the operating system.

According to implementations of the present disclosure, a non-transitory computer readable storage medium is provided. The storage medium is configured to store computer programs which, when executed by a processor, causes the processor to carry out following actions: obtaining, in a user space of an operating system, refresh information of a plurality of interface refresh operations, when the plurality of interface refresh operations are initiated by a plurality of foreground applications in the user space, wherein the refresh information includes a thread number of each interface refresh operation, refresh time and refresh contents corresponding to each thread number; and transmitting the obtained refresh information of the plurality of interface refresh operations to a kernel space of the operating system.

Figure 1:
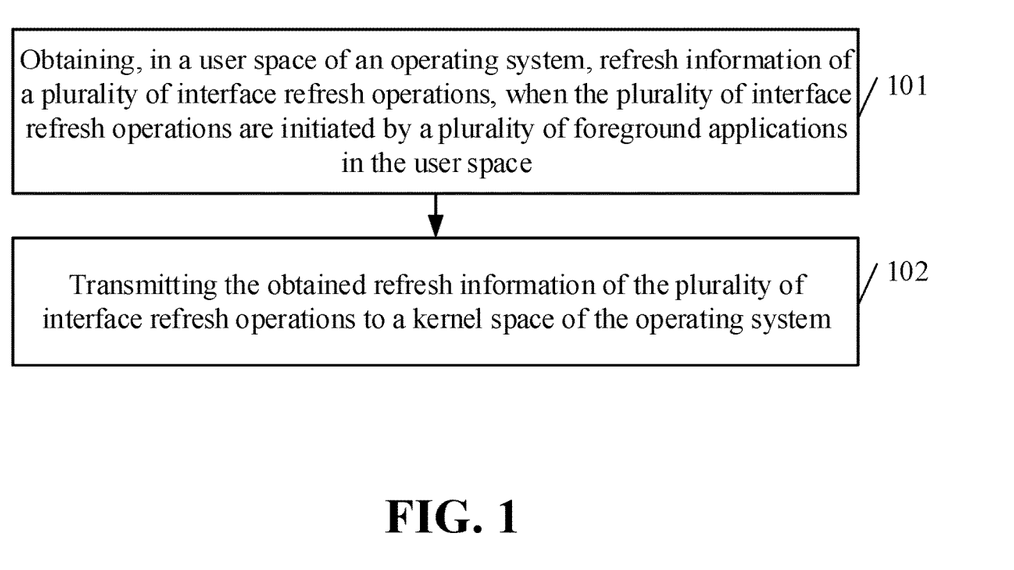
FIG. 1 is a schematic flowchart of a method for interface refresh synchronization according to an implementation of the present disclosure.

FIG. 1 is a schematic flowchart of a method for interface refresh synchronization according to an implementation of the present disclosure. The method begins at block 101.

At block 101, refresh information of a plurality of interface refresh operations is obtained in a user space of an operating system, when the plurality of interface refresh operations is initiated by a plurality of foreground applications in the user space.

Each foreground application generally runs in the user space of the operating system. The foreground applications are relative to the background applications. The foreground applications and the background applications refer to the applications that are running in the system. The applications which are currently displayed to the user and can be operated by the user are the foreground applications, and the background applications are running in the background of the system.

In a system having a human-machine interaction interface, the interface refresh rate and the interface refresh contents of the foreground applications of the human-machine interaction and interface refresh will directly affect user experience. For example, in an Internet interface of a mobile phone, the signal bar application is responsible for updating the signal display, and the browser is responsible for updating the content of the web-page, while the power control module is responsible for updating the icon for indicating battery level. In the present implementation, when any one of the foreground applications initiates an interface refresh operation, the refresh information of each interface refresh operation of the foreground application is obtained. The refresh information includes a thread number of each interface refresh operation, the refresh time and the refresh content of each frame corresponding to each thread number. Specifically, the thread number of the initiating application party can be queried through the standard interface of the operating system, it is clearly recorded that each refresh operation is initiated by which specific thread of which application, and the refresh information is classified according to its corresponding thread number, in order to effectively distinguish the display update in the same or different regions initiated by different threads of the same application. If there are a plurality of foreground applications simultaneously initiate interface refresh operations, the refresh information of each interface refresh operation of the plurality of foreground applications is obtained. In addition, the process number of the interface refresh operation may also be obtained, and each process may include a plurality of threads. It should be noted that, obtaining the refresh content of each frame may actually be achieved by obtaining the cache address of the refresh content, the kernel may obtain the refresh content from the cache address of the refresh content.

The interface refresh operation includes a graphics display operation and an image synthesis operation, that is, each foreground application completes the preparation of one frame display data of its display window, and then the display data prepared is synthesized with the content of the current entire display layer.

At block 102, the obtained refresh information of the plurality of interface refresh operations is transmitted to a kernel space of the operating system.

The use space may actively access a kernel interface and send the refresh information to the kernel.

According to the method for interface refresh synchronization of foreground application programs provided by the implementation of present disclosure, the refresh information of the plurality of interface refresh operations is obtained in the user space of the operating system, when the plurality of interface refresh operations are initiated by a plurality of foreground applications in the user space, and the obtained refresh information of the plurality of interface refresh operations is transmitted to a kernel space of the operating system, where the refresh information includes a thread number of each interface refresh operation, the refresh time and the refresh contents corresponding to each thread number, thereby the kernel can learn about each specific interface refresh operation of each foreground application.

Figure 2:
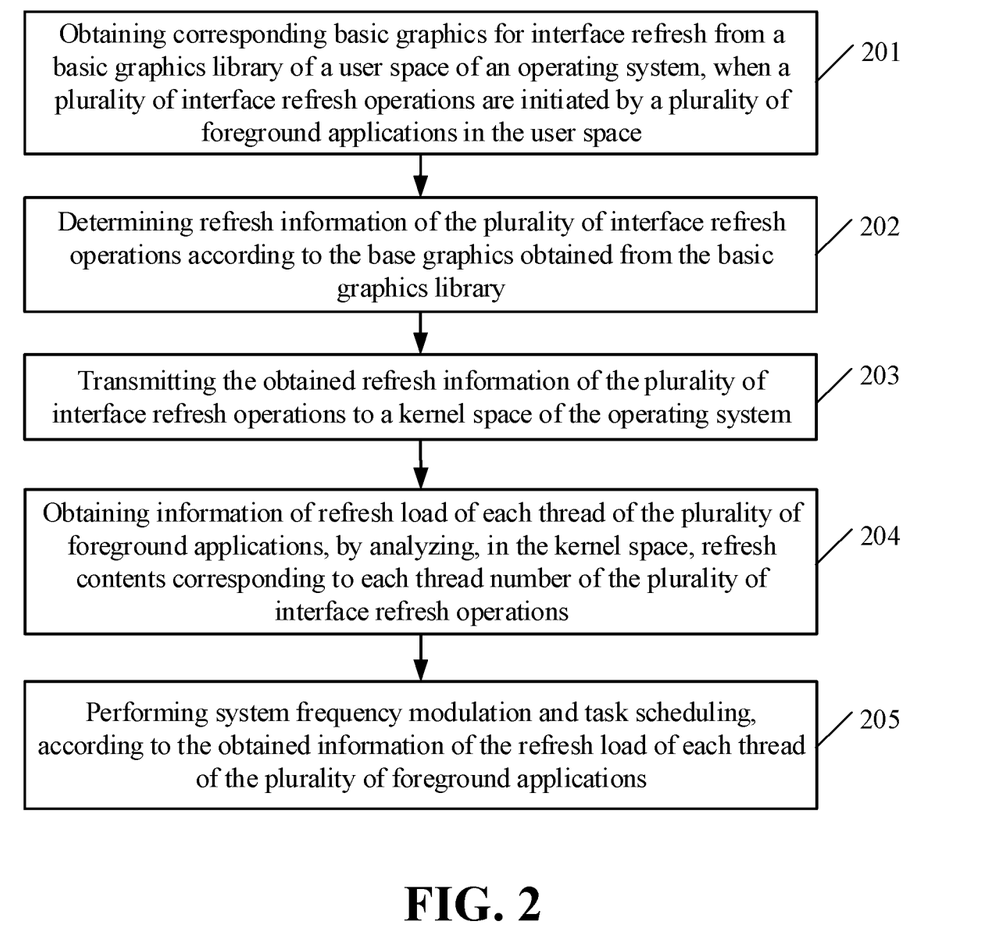
FIG. 2 is a schematic flowchart of another method for interface refresh synchronization according to an implementation of the present disclosure.

FIG. 2 is a schematic flowchart of another method for interface refresh synchronization according to an implementation of the present disclosure. The method begins at block 201.

At block 201, corresponding basic graphics for interface refresh are obtained from a basic graphics library of a user space of an operating system, when a plurality of interface refresh operations is initiated by a plurality of foreground applications in the user space.

At block 202, refresh information of the plurality of interface refresh operations is determined according to the base graphics obtained from the basic graphics library.

In the present implementation, when any one of the foreground applications initiates an interface refresh operation, the refresh information of each interface refresh operation of the foreground application is obtained. The refresh information includes a thread number of each interface refresh operation, the refresh time and the refresh content of each frame corresponding to each thread number. Specifically, each application directly calls the basic graphics library of the operating system in the process of calling the core function of the graphic display or the image synthesis, and acquires the corresponding basic graphic for the interface refresh. Since the basic graphic contain specific refresh contents, and the refresh contents include a plurality of factors, such as the size of the refresh window, pixels having refresh change, a refresh rate, and so on, therefore, the refresh contents of the interface refresh operations can be determined according to the basic graphics obtained from the basic graphics library, and then the thread number of the initiating application party can be queried through the standard interface of the operating system, it is clearly recorded that each refresh operation is initiated by which specific thread of which application, and the refresh information is classified according to its corresponding thread number, in order to effectively distinguish the display update in the same or different regions initiated by different threads of the same application, and the refresh time corresponding to each thread number is obtained. In addition, the process number of the interface refresh operation may also be obtained, and each process may include a plurality of threads. If there are a plurality of foreground applications simultaneously initiate interface refresh operations, the refresh information of each interface refresh operation of the plurality of foreground applications is obtained. It should be noted that, obtaining the refresh content of each frame may actually be achieved by obtaining the cache address of the refresh content.

The interface refresh operation includes a graphics display operation and an image synthesis operation, that is, each foreground application completes the preparation of one frame display data of its display window, and then the display data prepared is synthesized with the content of the current entire display layer.

At block 203, the obtained refresh information of the plurality of interface refresh operations is transmitted to a kernel space of the operating system.

The use space may actively access a kernel interface and send the refresh information to the kernel.

At block 204, information of refresh load of each thread of the plurality of foreground applications is obtained by analyzing, in the kernel space, refresh contents corresponding to each thread number of the plurality of interface refresh operations.

The refresh information of each application transmitted from the user space is organized according to predetermined data format, and a plurality of factors, such as the size of the refresh window, pixels having refresh change, a refresh rate, and so on, of the refresh content of each display thread of each application are analyzed and calculated, to obtain the information of the refresh load of each display thread of each application.

In a specific implementation, the operation at block 204 is implemented as follow. The information of the refresh load of each thread of the plurality of foreground applications is obtained by analyzing, in the kernel space, refresh contents corresponding to each thread number of the interface refresh operations of the plurality of foreground applications, according to weights set for a plurality of factors of the refresh contents by the plurality of foreground applications. The plurality of factors of the refresh contents include the size of the refresh window, pixels having refresh change, and a refresh rate. In the implementation, the refresh content of each frame interface of each application is analyzed according to the weights respectively set by each application for the plurality of factors of the refresh content, to obtain the information of the refresh load of each thread of each application, which can make the analysis results of the load more accurate.

At block 205, system frequency modulation and task scheduling are performed according to the obtained information of the refresh load of each thread of the plurality of foreground applications.

The analysis results are submitted to a task scheduler, a frequency governor and its CPU/GPU hot-plug of a kernel, which are used as auxiliary parameters for important decisions such as task priority, task scheduling, frequency modulation, switching core, and so on, so that the resource requirements for the interface update services of the foreground application can be accurately perceived, thereby the system frequency modulation and the task scheduling can be accurately performed.

According to the method for interface refresh synchronization of foreground application programs provided by the implementation of present disclosure, the refresh information of the plurality of interface refresh operations is obtained in the user space of the operating system, when the plurality of interface refresh operations are initiated by a plurality of foreground applications in the user space, and the obtained refresh information of the plurality of interface refresh operations is transmitted to a kernel space of the operating system, where the refresh information includes a thread number of each interface refresh operation, the refresh time and the refresh contents corresponding to each thread number, thereby the kernel can learn about each specific interface refresh operation of each foreground application. When the kernel learns about each specific interface refresh operation of each foreground application, the resource requirements for the interface update services of the foreground application can be accurately perceived, thereby the system frequency modulation and the task scheduling can be accurately performed.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

Figure 3:
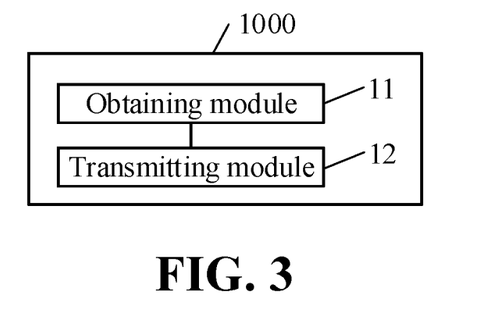
FIG. 3 is a schematic structural diagram of an apparatus for interface refresh synchronization according to an implementation of the present disclosure.

FIG. 3 is a schematic structural diagram of an apparatus for interface refresh synchronization of foreground application programs according to an implementation of the present disclosure. The apparatus 1000 includes two operating spaces which include a kernel space and a user space. The functions of the apparatus 1000 are implemented in the two operating spaces. In the implementation, the apparatus 1000 includes an obtaining module 11 (such as a processor) and a transmitting module 12 (such as a processor).

Specifically, the obtaining module 11 is configured to obtain, in a user space, refresh information of a plurality of interface refresh operations, when the plurality of interface refresh operations is initiated by a plurality of foreground applications in the user space of an operating system.

Each foreground application generally runs in the user space of the operating system. The foreground applications are relative to the background applications. The foreground applications and the background applications refer to the applications that are running in the system. The applications which are currently displayed to the user and can be operated by the user are the foreground applications, and the background applications are running in the background of the system.

In a system having a human-machine interaction interface, the interface refresh rate and the interface refresh contents of the foreground applications of the human-machine interaction and interface refresh will directly affect user experience. For example, in an Internet interface of a mobile phone, the signal bar application is responsible for updating the signal display, and the browser is responsible for updating the content of the web-page, while the power control module is responsible for updating the icon for indicating battery level. In the present implementation, when any one of the foreground applications initiates an interface refresh operation, the refresh information of each interface refresh operation of the foreground application is obtained. The refresh information includes a thread number of each interface refresh operation, the refresh time and the refresh content of each frame corresponding to each thread number. Specifically, the thread number of the initiating application party can be queried through the standard interface of the operating system, it is clearly recorded that each refresh operation is initiated by which specific thread of which application, and the refresh information is classified according to its corresponding thread number, in order to effectively distinguish the display update in the same or different regions initiated by different threads of the same application. If there are a plurality of foreground applications simultaneously initiate interface refresh operations, the refresh information of each interface refresh operation of the plurality of foreground applications is obtained. In addition, the process number of the interface refresh operation may also be obtained, and each process may include a plurality of threads. It should be noted that, obtaining the refresh content of each frame may actually be achieved by obtaining the cache address of the refresh content, the kernel may obtain the refresh content from the cache address of the refresh content.

The interface refresh operation includes a graphics display operation and an image synthesis operation, that is, each foreground application completes the preparation of one frame display data of its display window, and then the display data prepared is synthesized with the content of the current entire display layer.

The transmitting module 12 is configured to transmit the obtained refresh information of the plurality of interface refresh operations to a kernel space of the operating system.

The use space may actively access a kernel interface and send the refresh information to the kernel.

According to the apparatus for interface refresh synchronization of foreground application programs provided by the implementation of present disclosure, the refresh information of the plurality of interface refresh operations is obtained in the user space of the operating system, when the plurality of interface refresh operations are initiated by the plurality of foreground applications in the user space, and the obtained refresh information of the plurality of interface refresh operations is transmitted to a kernel space of the operating system, where the refresh information includes a thread number of each interface refresh operation, the refresh time and the refresh contents corresponding to each thread number, thereby the kernel can learn about each specific interface refresh operation of each foreground application.

Figure 4:
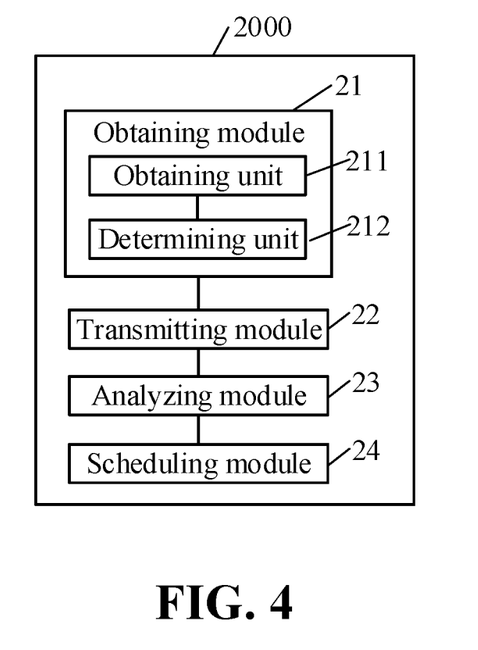
FIG. 4 is a schematic structural diagram of another apparatus for interface refresh synchronization of foreground application programs according to an implementation of the present disclosure.

FIG. 4 is a schematic structural diagram of another apparatus for interface refresh synchronization of foreground application programs according to an implementation of the present disclosure. The apparatus 2000 includes two operating spaces which include a kernel space and a user space. The functions of the apparatus 2000 are implemented in the two operating spaces. In the implementation, the apparatus 2000 includes an obtaining module 21 (such as a processor), a transmitting module 22 (such as a processor), an analyzing module 23 (such as a processor) and a scheduling module 24 (such as a processor).

Specifically, the obtaining module 21 is configured to obtain, in a user space, refresh information of a plurality of interface refresh operations, when the plurality of interface refresh operations is initiated by a plurality of foreground applications in the user space of an operating system.

In the implementation, the obtaining module 21 includes an obtaining unit 211 (such as a processor) and a determining unit 212 (such as a processor).

Specifically, the obtaining module 21 is configured to obtain corresponding basic graphics for interface refresh from a basic graphics library of the user space, when the plurality of interface refresh operations is initiated by the plurality of foreground applications in the user space of the operating system.

The determining unit 212 is configured to determine the refresh information of the plurality of interface refresh operations according to the base graphics obtained from the basic graphics library.

In the present implementation, when any one of the foreground applications initiates an interface refresh operation, the refresh information of each interface refresh operation of the foreground application is obtained. The refresh information includes a thread number of each interface refresh operation, the refresh time and the refresh content of each frame corresponding to each thread number. Specifically, each application directly calls the basic graphics library of the operating system in the process of calling the core function of the graphic display or the image synthesis, and acquires the corresponding basic graphic for the interface refresh. Since the basic graphic contain specific refresh contents, and the refresh contents include a plurality of factors, such as the size of the refresh window, pixels having refresh change, a refresh rate, and so on, therefore, the refresh contents of the interface refresh operations can be determined according to the basic graphics obtained from the basic graphics library, and then the thread number of the initiating application party can be queried through the standard interface of the operating system, it is clearly recorded that each refresh operation is initiated by which specific thread of which application, and the refresh information is classified according to its corresponding thread number, in order to effectively distinguish the display update in the same or different regions initiated by different threads of the same application, and the refresh time corresponding to each thread number is obtained. In addition, the process number of the interface refresh operation may also be obtained, and each process may include a plurality of threads. If there are a plurality of foreground applications simultaneously initiate interface refresh operations, the refresh information of each interface refresh operation of the plurality of foreground applications is obtained. It should be noted that, obtaining the refresh content of each frame may actually be achieved by obtaining the cache address of the refresh content.

The interface refresh operation includes a graphics display operation and an image synthesis operation, that is, each foreground application completes the preparation of one frame display data of its display window, and then the display data prepared is synthesized with the content of the current entire display layer.

The transmitting module 22 is configured to transmit the obtained refresh information of the plurality of interface refresh operations to a kernel space of the operating system.

The use space may actively access a kernel interface and send the refresh information to the kernel.

The analyzing module 23 is configured to analyze, in the kernel space, refresh contents corresponding to each thread number of the plurality of interface refresh operations, to obtain information of refresh load of each thread of the plurality of foreground applications.

The refresh information of each application transmitted from the user space is organized according to predetermined data format, and a plurality of factors, such as the size of the refresh window, pixels having refresh change, a refresh rate, and so on, of the refresh content of each display thread of each application are analyzed and calculated, to obtain the information of the refresh load of each display thread of each application.

In a specific implementation, the analyzing module 23 is specifically configured to obtain the information of the refresh load of each thread of the plurality of foreground applications, by analyzing, in the kernel space, the refresh contents corresponding to each thread number of the interface refresh operations of the plurality of foreground applications, according to weights set for a plurality of factors of the refresh contents by the plurality of foreground applications. The plurality of factors of the refresh contents include the size of the refresh window, pixels having refresh change, and a refresh rate. In the implementation, the refresh content of each frame interface of each application is analyzed according to the weights respectively set by each application for the plurality of factors of the refresh content, to obtain the information of the refresh load of each thread of each application, which can make the analysis results of the load more accurate.

The scheduling module 24 is configured to perform system frequency modulation and task scheduling, according to the obtained information of the refresh load of each thread of the plurality of foreground applications.

The analysis results are submitted to a task scheduler, a frequency governor and its CPU/GPU hot-plug of a kernel, which are used as auxiliary parameters for important decisions such as task priority, task scheduling, frequency modulation, switching core, and so on, so that the resource requirements for the interface update services of the foreground application can be accurately perceived, thereby the system frequency modulation and the task scheduling can be accurately performed.

According to the apparatus for interface refresh synchronization of foreground application programs provided by the implementation of present disclosure, the refresh information of the plurality of interface refresh operations is obtained in the user space of the operating system, when a plurality of interface refresh operations are initiated by a plurality of foreground applications in the user space, and the obtained refresh information of the plurality of interface refresh operations is transmitted to a kernel space of the operating system, where the refresh information includes a thread number of each interface refresh operation, the refresh time and the refresh contents corresponding to each thread number, thereby the kernel can learn about each specific interface refresh operation of each foreground application. When the kernel learns about each specific interface refresh operation of each foreground application, the resource requirements for the interface update services of the foreground application can be accurately perceived, thereby the system frequency modulation and the task scheduling can be accurately performed.

Figure 5:
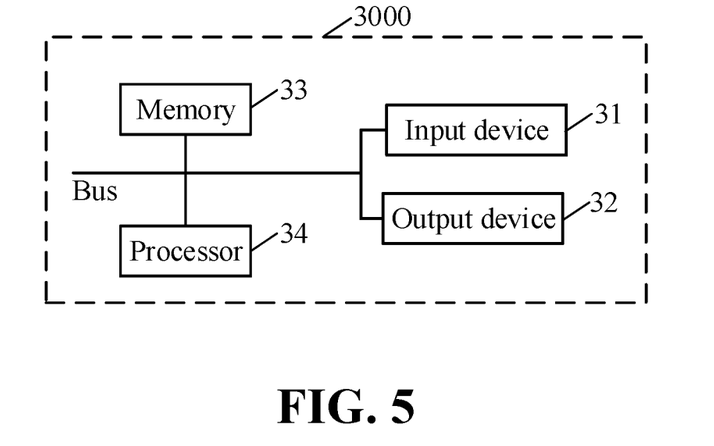
FIG. 5 is a schematic structural diagram of a terminal device according to an implementation of the present disclosure.

FIG. 5 is a schematic structural diagram of a terminal device according to an implementation of the present disclosure. As illustrated in FIG. 5, the terminal device 3000 includes an input device 31, an output device 32, a memory 33 and a processor 34 (the terminal device may include one or more processors 34, in FIG. 5, the terminal device including one processor is taken as an example.) In some implementations of the present disclosure, the input device 31, the output device 32, the memory 33, and the processor 34 may be coupled to each other via a bus or other means. In FIG. 5, the bus connection is taken as an example.

The memory 33 is configured to store instructions.

The processor 34 is configured to execute the instructions to perform operations as follow: obtaining, in a user space of an operating system, refresh information of a plurality of interface refresh operations, when the plurality of interface refresh operations are initiated by a plurality of foreground applications in the user space, the refresh information including a thread number of each interface refresh operation, refresh time and refresh content corresponding to each thread number; and transmitting the obtained refresh information of the plurality of interface refresh operations to a kernel space of the operating system.

Preferably, the processor 34 is further configured to obtain information of refresh load of each thread of the plurality of foreground applications, by analyzing, in the kernel space, refresh contents corresponding to each thread number of the plurality of interface refresh operations; and perform system frequency modulation and task scheduling, according to the obtained information of the refresh load of each thread of the plurality of foreground applications.

Preferably, the interface refresh operation includes a graphics display operation and an image synthesis operation.

Preferably, the processor 34 is specifically configured to obtain corresponding basic graphics for interface refresh from a basic graphics library of the user space, when the plurality of interface refresh operations are initiated by the plurality of foreground applications in the user space of the operating system; and determine the refresh information of the plurality of interface refresh operations according to the base graphics obtained from the basic graphics library.

Preferably, the processor 34 is specifically configured to analyze, in the kernel space, the refresh contents corresponding to each thread number of the interface refresh operations of the plurality of foreground applications, according to weights set for a plurality of factors of the refresh contents by the plurality of foreground applications, to obtain the information of the refresh load of each thread of the plurality of foreground applications. The plurality of factors of the refresh contents include the size of the refresh window, pixels having refresh change, and a refresh rate.

According to the terminal device for interface refresh synchronization of foreground application programs provided by the implementation of present disclosure, the refresh information of the plurality of interface refresh operations is obtained in the user space of the operating system, when the plurality of interface refresh operations are initiated by a plurality of foreground applications in the user space, and the obtained refresh information of the plurality of interface refresh operations is transmitted to a kernel space of the operating system, where the refresh information includes a thread number of each interface refresh operation, the refresh time and the refresh contents corresponding to each thread number, thereby the kernel can learn about each specific interface refresh operation of each foreground application. When the kernel learns about each specific interface refresh operation of each foreground application, the resource requirements for the interface update services of the foreground application can be accurately perceived, thereby the system frequency modulation and the task scheduling can be accurately performed.

Implementations of the present disclosure also provide a non-transitory computer readable storage medium, on which a computer program is stored. The computer program is executed by a processor to carry out following actions. Refresh information of a plurality of interface refresh operations is obtained in a user space of an operating system, when the plurality of interface refresh operations is initiated by a plurality of foreground applications in the user space, the refresh information including a thread number of each interface refresh operation, refresh time and refresh content corresponding to each thread number. The obtained refresh information of the plurality of interface refresh operations is transmitted to a kernel space of the operating system.

The computer program is further executed by the processor to carry out following actions. Information of refresh load of each thread of the plurality of foreground applications is obtained by analyzing, in the kernel space, refresh contents corresponding to each thread number of the plurality of interface refresh operations. System frequency modulation and task scheduling are performed, according to the obtained information of the refresh load of each thread of the plurality of foreground applications.

The computer program executed by the processor to carry out the action of obtaining information of refresh load of each thread of a plurality of foreground applications, by analyzing, in the kernel space, refresh contents corresponding to each thread number of the plurality of interface refresh operations is executed by the processor to carry out following actions. The information of the refresh load of each thread of the plurality of foreground applications is obtained by analyzing, in the kernel space, the refresh contents corresponding to each thread number of the interface refresh operations of the plurality of foreground applications, according to weights set for a plurality of factors of the refresh contents by the plurality of foreground applications. The plurality of factors of the refresh contents include the size of the refresh window, pixels having refresh change, and a refresh rate.

The computer program executed by the processor to carry out the action of performing system frequency modulation and task scheduling, according to the obtained information of the refresh load of each thread of the plurality of foreground applications is executed by the processor to carry out following actions. The obtained information of the refresh load of each thread of the plurality of foreground applications is sent to a task scheduler, a frequency governor, and a CPU/GPU hot-plug of a kernel, whereby the task scheduler, the frequency governor, and the CPU/GPU hot-plug perform, according to the obtained information of the refresh load of each thread of the plurality of foreground applications, the system frequency modulation and the task scheduling.

The computer program executed by the processor to carry out the action of obtaining, in a user space of an operating system, refresh information of a plurality of interface refresh operations, when the plurality of interface refresh operations is initiated by a plurality of foreground applications in the user space is executed by the processor to carry out following actions. Corresponding basic graphics for interface refresh are obtained from a basic graphics library of the user space of the operating system, when the plurality of interface refresh operations is initiated by the plurality of foreground applications in the user space. The refresh information of the plurality of interface refresh operations is determined according to the base graphics obtained from the basic graphics library.

The computer program executed by the processor to carry out the action of transmitting the obtained refresh information of the plurality of interface refresh operations to a kernel space of the operating system is executed by the processor to carry out following actions. The kernel interface is accessed actively via the user space, and the obtained refresh information of the plurality of interface refresh operations is transmitted to the kernel space of the operating system.

In the foregoing implementations, the description of each implementation has its own emphasis. For the parts not described in detail in one implementation, reference may be made to related descriptions of other implementations.

According to the description of the above implementations, those skilled in the art can clearly understand that the present disclosure may be implemented by using hardware, firmware, or combinations thereof. When implemented by using software, the function modules described above may be stored in a computer readable medium or transmitted as one or more instructions or codes on the computer readable medium. Computer readable medium includes computer storage medium and communication medium. The communication medium includes any medium that facilitates the transfer of a computer program from one location to another. The storage medium may be any available medium that can be accessed by a computer. For example, but not limited to, the computer readable medium may include a random access memory (RAM), a read-only memory (ROM), an electrically erasable programmable read-only memory (EEPROM), a compact disc read-only memory (CD-ROM) or other optical disc storage, a magnetic storage medium or other magnetic storage devices, or any other medium that can be configured to carry or store desired program code having instructions or data structures, and can be accessed by the computer. Besides, any connection may suitably be a computer readable medium. For example, if the software is transmitted from a website, server, or other remote source using coaxial cable, fiber optic cable, twisted pair, digital subscriber line (DSL), or wireless technologies such as infrared, radio, and microwave, then the coaxial cable, fiber optic cable, twisted pair, DSL or wireless technologies such as infrared, wireless and microwave are included in the fixing of the associated medium. As used in the present disclosure, a disk and a disc include a compact disc (CD), a laser disc, a compact disc, a digital versatile disc (DVD), a floppy disk, and a Blu-ray disc. The disc usually replicates data magnetically, while the disc uses a laser to optically replicate data. Combinations of the above should also be included within the scope of the computer readable medium.

In summary, the foregoing description merely depicts some preferred implementations of the technical solution of the present disclosure, and therefore is not intended as limiting the scope of the present disclosure. Any modifications, equivalent substitutions, improvements or the like made within the spirit and principle of the present disclosure, shall fall within the scope of the present disclosure.

What is claimed is:

1. A method for interface refresh synchronization, comprising:
obtaining, in a user space of an operating system, refresh information of a plurality of interface refresh operations, when the plurality of interface refresh operations is initiated by a plurality of foreground applications in the user space, wherein the refresh information comprises a thread number of each interface refresh operation, refresh time and refresh contents corresponding to each thread number; and
transmitting the refresh information of the plurality of interface refresh operations to a kernel space of the operating system.

2. The method of claim 1, further comprising:
obtaining information of refresh load of each thread of the plurality of foreground applications, by analyzing, in the kernel space, the refresh contents corresponding to each thread number of the plurality of interface refresh operations; and
performing system frequency modulation and task scheduling, according to the information of the refresh load of each thread of the plurality of foreground applications.

3. The method of claim 2, wherein obtaining the information of the refresh load of each thread of the plurality of foreground applications, by analyzing, in the kernel space, the refresh contents corresponding to each thread number of the plurality of interface refresh operations, comprises:
obtaining the information of the refresh load of each thread of the plurality of foreground applications, by analyzing, in the kernel space, the refresh contents corresponding to each thread number of the interface refresh operations of the plurality of foreground applications, according to weights set for a plurality of factors of the refresh contents by the plurality of foreground applications, wherein the plurality of factors of the refresh contents comprise a size of a refresh window, pixels having refresh change, and a refresh rate.

4. The method of claim 2, wherein performing the system frequency modulation and the task scheduling, according to the information of the refresh load of each thread of the plurality of foreground applications, comprises:
sending the information of the refresh load of each thread of the plurality of foreground applications to a task scheduler, a frequency governor, and a CPU/GPU hot-plug of a kernel, whereby the task scheduler, the frequency governor, and the CPU/GPU hot-plug perform, according to the information of the refresh load of each thread of the plurality of foreground applications, the system frequency modulation and the task scheduling.

5. The method of claim 1, wherein obtaining, in the user space of the operating system, the refresh information of the plurality of interface refresh operations, when the plurality of interface refresh operations is initiated by the plurality of foreground applications in the user space, comprises:
obtaining corresponding basic graphics for interface refresh from a basic graphics library of the user space of the operating system, when the plurality of interface refresh operations is initiated by the plurality of foreground applications in the user space; and
determining the refresh information of the plurality of interface refresh operations according to base graphics obtained from the basic graphics library.

6. The method of claim 5, wherein the interface refresh operations comprise a graphics display operation and an image synthesis operation.

7. The method of claim 1, wherein transmitting the refresh information of the plurality of interface refresh operations to the kernel space of the operating system, comprises:

accessing a kernel interface actively via the user space; and transmitting the refresh information of the plurality of interface refresh operations to the kernel space of the operating system.

8. A terminal device, comprising:

at least one processor; and a computer readable storage, coupled to the at least one processor and storing at least one computer executable instruction thereon, which when executed by the at least one processor, cause the at least one processor to:

obtain, in a user space of an operating system, refresh information of a plurality of interface refresh operations, when the plurality of interface refresh operations is initiated by a plurality of foreground applications in the user space, wherein the refresh information comprises a thread number of each interface refresh operation, refresh time and refresh contents corresponding to each thread number; and transmit the refresh information of the plurality of interface refresh operations to a kernel space of the operating system.

9. The terminal device of claim 8, wherein the at least one processor is further caused to:

obtain information of refresh load of each thread of the plurality of foreground applications, by analyzing, in the kernel space, the refresh contents corresponding to each thread number of the plurality of interface refresh operations; and perform system frequency modulation and task scheduling, according to the information of the refresh load of each thread of the plurality of foreground applications.

10. The terminal device of claim 9, wherein the at least one processor caused to obtain the information of refresh load of each thread of the plurality of foreground applications, by analyzing, in the kernel space, the refresh contents corresponding to each thread number of the plurality of interface refresh operations is caused to:

obtain the information of the refresh load of each thread of the plurality of foreground applications, by analyzing, in the kernel space, the refresh contents corresponding to each thread number of the interface refresh operations of the plurality of foreground applications, according to weights set for a plurality of factors of the refresh contents by the plurality of foreground applications, wherein the plurality of factors of the refresh contents comprise a size of a refresh window, pixels having refresh change, and a refresh rate.

11. The terminal device of claim 9, wherein the at least one processor caused to perform the system frequency modulation and the task scheduling, according to the information of the refresh load of each thread of the plurality of foreground applications is caused to:

send the information of the refresh load of each thread of the plurality of foreground applications to a task scheduler, a frequency governor, and a CPU/GPU hot-plug of a kernel, wherein the task scheduler, the frequency governor, and the CPU/GPU hot-plug perform, according to the information of the refresh load of each thread of the plurality of foreground applications, the system frequency modulation and the task scheduling.

12. The terminal device of claim 8, wherein the at least one processor caused to obtain, in the user space of the operating system, the refresh information of the plurality of interface refresh operations, when the plurality of interface refresh operations are initiated by the plurality of foreground applications in the user space is caused to:

obtain corresponding basic graphics for interface refresh from a basic graphics library of the user space, when the plurality of interface refresh operations is initiated by the plurality of foreground applications in the user space of the operating system; and determine the refresh information of the plurality of interface refresh operations according to base graphics obtained from the basic graphics library.

13. The terminal device of claim 12, wherein the interface refresh operations comprise a graphics display operation and an image synthesis operation.

14. The terminal device of claim 8, wherein the at least one processor caused to transmit the refresh information of the plurality of interface refresh operations to the kernel space of the operating system is caused to:

access a kernel interface actively via the user space; and transmit the refresh information of the plurality of interface refresh operations to the kernel space of the operating system.

15. A non-transitory computer-readable storage medium storing a computer program which, when executed by a processor, causes the processor to:

obtain, in a user space of an operating system, refresh information of a plurality of interface refresh operations, when the plurality of interface refresh operations is initiated by a plurality of foreground applications in the user space, wherein the refresh information comprises a thread number of each interface refresh operation, refresh time and refresh contents corresponding to each thread number; and transmit the refresh information of the plurality of interface refresh operations to a kernel space of the operating system.

16. The non-transitory computer-readable storage medium of claim 15, wherein the computer program is further executed by the processor to:

obtain information of refresh load of each thread of the plurality of foreground applications, by analyzing, in the kernel space, the refresh contents corresponding to each thread number of the plurality of interface refresh operations; and perform system frequency modulation and task scheduling, according to the information of the refresh load of each thread of the plurality of foreground applications.

17. The non-transitory computer-readable storage medium of claim 16, wherein the computer program executed by the processor to obtain the information of the refresh load of each thread of the plurality of the foreground applications, by analyzing, in the kernel space, the refresh contents corresponding to each thread number of the plurality of interface refresh operations is executed by the processor to:

obtain the information of the refresh load of each thread of the plurality of foreground applications, by analyzing, in the kernel space, the refresh contents corresponding to each thread number of the interface refresh operations of the plurality of foreground applications, according to weights set for a plurality of factors of the refresh contents by the plurality of foreground applications, wherein the plurality of factors of the refresh contents comprise a size of a refresh window, pixels having refresh change, and a refresh rate.

18. The non-transitory computer-readable storage medium of claim 16, wherein the computer program executed by the processor to perform the system frequency modulation and the task scheduling, according to the information of the refresh load of each thread of the plurality of foreground applications is executed by the processor to:

send the information of the refresh load of each thread of the plurality of foreground applications to a task scheduler, a frequency governor, and a CPU/GPU hot-plug of a kernel, wherein the task scheduler, the frequency governor, and the CPU/GPU hot-plug perform, according to the information of the refresh load of each thread of the plurality of foreground applications, the system frequency modulation and the task scheduling.

19. The non-transitory computer-readable storage medium of claim 15, wherein the computer program executed by the processor to obtain, in the user space of the operating system, the refresh information of the plurality of interface refresh operations, when the plurality of interface refresh operations are initiated by the plurality of foreground applications in the user space is executed by the processor to:

obtain corresponding basic graphics for interface refresh from a basic graphics library of the user space of the operating system, when the plurality of interface refresh operations is initiated by the plurality of foreground applications in the user space; and determine the refresh information of the plurality of interface refresh operations according to base graphics obtained from the basic graphics library.

20. The non-transitory computer-readable storage medium of claim 15, wherein the computer program executed by the processor to transmit the refresh information of the plurality of interface refresh operations to the kernel space of the operating system is executed by the processor to:

access a kernel interface actively via the user space; and transmit the refresh information of the plurality of interface refresh operations to the kernel space of the operating system.

* * * * *